United States Patent
Cao et al.

(10) Patent No.: US 9,946,132 B2
(45) Date of Patent: Apr. 17, 2018

(54) ARRAY SUBSTRATE AND LIQUID CRYSTAL DISPLAY PANEL

(71) Applicants: Shanghai Tianma Micro-Electronics Co., Ltd., Shanghai (CN); Tianma Micro-Electronics Co., Ltd., Shenzhen (CN)

(72) Inventors: Zhaokeng Cao, Shanghai (CN); Dandan Qin, Shanghai (CN); Tingting Cui, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 15/485,631

(22) Filed: Apr. 12, 2017

(65) Prior Publication Data

US 2017/0261827 A1    Sep. 14, 2017

Related U.S. Application Data

(62) Division of application No. 14/722,072, filed on May 26, 2015, now Pat. No. 9,645,437.

(30) Foreign Application Priority Data

Nov. 6, 2014   (CN) .......................... 2014 1 0621029

(51) Int. Cl.
*G02F 1/1333*    (2006.01)
*G02F 1/1335*    (2006.01)
(Continued)

(52) U.S. Cl.
CPC .. *G02F 1/136286* (2013.01); *G02F 1/133514* (2013.01); *G02F 1/134309* (2013.01); *G02F 2001/136254* (2013.01)

(58) Field of Classification Search
CPC ..... H01L 27/12; H01L 27/14; H01L 27/1237; H01L 27/124; H01L 27/1251;
(Continued)

(56) References Cited

U.S. PATENT DOCUMENTS 7,279,730 B2 * 10/2007 Pak ....................... G02F 1/1362
                                                    257/290
7,928,437 B2    4/2011 Shin et al.
(Continued)

FOREIGN PATENT DOCUMENTS

CN    101221330 A    7/2008
CN    101726942 A    6/2010
(Continued)

*Primary Examiner* — Natalia Gondarenko
(74) *Attorney, Agent, or Firm* — Anova Law Group, PLLC

(57) ABSTRACT

An array substrate and a liquid crystal display panel including the array substrate are provided. The array substrate includes: multiple pixel units; at least one additional functional area located in each row of a matrix formed by the multiple pixel units, where the additional functional area is provided with a gate signal detecting transistor; and a detection signal output line and a preset signal line connected with each other. By detecting whether a drive signal on a gate line is normal using the gate signal detecting transistor, the problem of manually detecting one-by one whether a signal on a gate line is normal can be avoided, thereby improving the detection efficiency and accuracy.

14 Claims, 7 Drawing Sheets

(51) Int. Cl.
*G02F 1/1362* (2006.01)
*G02F 1/1343* (2006.01)
*G02F 1/1368* (2006.01)

(58) Field of Classification Search
CPC ............. H01L 27/1259; H01L 27/1446; H01L 27/14665; H01L 27/3241; H01L 27/3244; H01L 27/3248; H01L 27/3262; H01L 27/3269; H01L 27/3276; H01L 27/3281; H01L 29/786; H01L 29/78633; G02F 1/1333; G02F 1/1362; G02F 1/133514; G02F 1/134336; G02F 1/136286; G02F 1/1368; G02F 1/134309; G02F 2001/136254; G09G 3/36; G09G 3/3648; G09G 3/367; G09G 3/3685; G09G 3/3688; G09G 2300/0439; G09G 2300/0443; G09G 2300/0447; G09G 2360/14; G09G 2360/142; G09G 2360/147; G09G 2360/148; G09G 2360/141; G09G 2360/144; G09G 2360/145

USPC ...... 345/81, 84, 97, 90, 92, 100; 257/72, 43, 257/59, E31.06, E21.615; 438/30
See application file for complete search history.

(56) References Cited

U.S. PATENT DOCUMENTS

| | | | |
|---|---|---|---|
| 2004/0207018 | A1 | 10/2004 | Jang |
| 2006/0119757 | A1 | 6/2006 | Tsao |
| 2008/0111779 | A1 | 5/2008 | Matsumoto |
| 2011/0220889 | A1* | 9/2011 | Kurokawa ............ G02F 1/1362 257/43 |
| 2013/0127787 | A1* | 5/2013 | Kim ................... G06F 3/0412 345/175 |
| 2015/0228214 | A1* | 8/2015 | Liao ................... G09G 3/2003 345/84 |

FOREIGN PATENT DOCUMENTS

| | | |
|---|---|---|
| CN | 102455553 A | 5/2012 |
| JP | 2008134600 A | 6/2008 |
| TW | 200620617 A | 6/2006 |

\* cited by examiner

ARRAY SUBSTRATE AND LIQUID CRYSTAL DISPLAY PANEL

CROSS-REFERENCES TO RELATED APPLICATIONS

This application is a divisional application of U.S. patent application Ser. No. 14/722,072, filed on May 26, 2015, which claims the benefit of priority to Chinese Patent Application No. 201410621029.1, filed with the Chinese Patent Office on Nov. 6, 2014 and entitled "ARRAY SUBSTRATE AND LIQUID DISPLAY PANEL", the content of all of which is incorporated herein by reference in its entirety.

TECHNICAL FIELD

The disclosure relates to the field of liquid crystal displays, and in particular to an array substrate and a liquid crystal display panel including the array substrate.

BACKGROUND OF THE INVENTION

A liquid crystal display device has advantages of low voltage, low power consumption, large amount of display information and easy to be colorized, and has been widely used in electronic devices, such as electronic computers, electronic notepads, mobile phones, cameras and high-definition televisions. A liquid crystal display device generally includes a liquid crystal display panel for displaying a picture and a circuit for providing signals to the liquid crystal display panel. The liquid crystal display panel generally includes a Thin Film Transistor (TFT) array substrate, a color film substrate and a liquid crystal layer which comprises liquid crystal molecules disposed between the array substrate and the color film substrate.

In general, the TFT array substrate is provided with multiple video signal lines (also referred to as data lines) and multiple scanning lines (also referred to as gate lines) intersecting the video signal lines, multiple regions are formed on the TFT array substrate by the video signal lines and the scanning lines. Each of the regions is provided with a pixel electrode and a switching element TFT for selectively providing video signals to the pixel electrode. The switching element TFT and the pixel electrode form the pixel unit.

On the TFT array substrate, a signal on the gate line plays an important role to display for the liquid crystal display panel, for example, it is configured to drive each pixel unit to be turned on or turned off. However, presently whether the signal on the gate line is operational can only be detected manually one by one, thereby resulting in low efficiency; and with an increase in density of the gate lines, the method for manually detecting whether the signal on the gate line is operational becomes less effective.

BRIEF SUMMARY OF THE INVENTION

In view of the above problems, the present invention provides an array substrate and a liquid crystal display panel including the array substrate, which can detect whether or not a signal on a gate line is operational.

In order to solve the technical problems above, the present invention provides following technical solutions.

Embodiments of the present invention provides an array substrate. The array substrate includes: multiple pixel units arranged in a matrix, which are defined by multiple gate lines and multiple data lines intersecting the multiple gate lines, where the pixel units form a matrix of rows and columns; where at least one additional functional area is located in each row of the matrix, and the at least one additional functional area is provided with a gate signal detecting transistor; and a detection signal output line and a preset signal line connected with each other; where the gate signal detecting transistor includes a gate electrode, a source electrode and a drain electrode, the gate electrode and the source electrode are connected to a gate line corresponding to a row in which the gate signal detecting transistor is located, and the drain electrode is connected to the preset signal line.

A liquid crystal display panel is further provided, which includes the array substrate described above.

Compared with the conventional technology, the disclosure has the following advantages:

besides the pixel units for displaying, the array substrate provided in the disclosure further includes the additional functional area which is provided with the gate signal detecting transistor; and the gate electrode of the gate signal detecting transistor is connected to the gate line corresponding to a row where the gate signal detecting transistor is located. In the case that a gate driver corresponding to the gate line works normally, the gate driver applies a high level drive signal to the gate line to turn on the gate signal detecting transistor connected to the gate line, and a detection signal output from the gate signal detecting transistor is also a high level, thereby obtaining a high level signal on the detection signal output line. In the case that a certain gate line malfunctions, the gate signal detecting transistor connected to the certain gate line can not output a detection signal or outputs a low level detection signal, and no normal high level signal is obtained on the detection signal output line. Therefore, whether the gate line malfunctions can be detected using the detection signal output from the gate signal detecting transistor, and the gate line which malfunctions can be detected by detecting a time instant when no detection signal can be output or a time instant when an abnormal detection signal occurs.

According to the present disclosure, the abnormality of the signal on the gate line can be detected by the gate signal detecting transistor provided on the array substrate, and a problem for manually detecting whether the signals on the gate lines are normal one by one is avoided, thereby improving the detection efficiency and accuracy.

BRIEF DESCRIPTION OF THE DRAWINGS

In order to make the technical solutions of the disclosure to be understood more clearly, hereinafter the drawings for the description of the embodiments of the invention will be illustrated briefly. Apparently, the drawings described below are only some of the embodiments of the invention, and other drawings may also be obtained by those skilled in the art without any creative work.

DETAILED DESCRIPTION OF THE PREFERRED EMBODIMENTS

In order to make the objects, the technical solutions and the advantages of the embodiments of the invention more clearly, hereinafter the technical solutions of the embodiments of the invention will be described clearly and completely in conjunction with the drawings of the embodiments of the invention. Apparently, the described embodiments are some of the embodiments of the invention, not all the embodiments. All of other embodiments obtained based on the embodiments of the invention by those skilled in the art without any creative work fall within the scope of protection of the disclosure.

Figure 1:
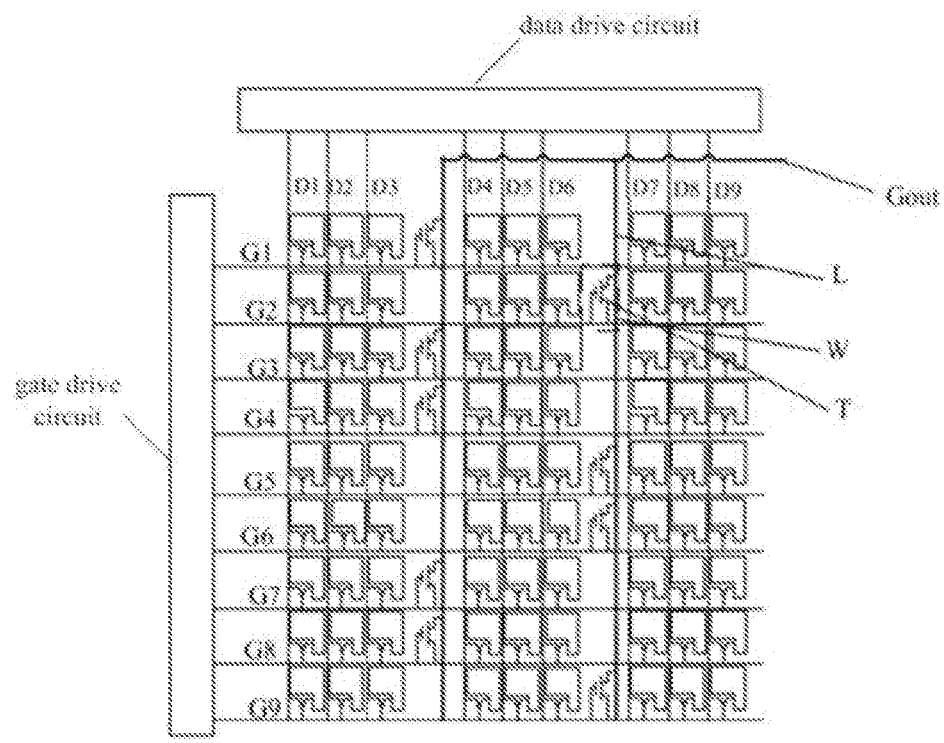
FIG. 1 is a schematic structural diagram of an array substrate according to an embodiment of the invention.

FIG. 1 is a schematic structural diagram of an array substrate according to an embodiment of the invention. As shown in FIG. 1, the array substrate includes multiple pixel units arranged in a matrix, which are defined by multiple gate lines G1 to Gn extending in a row direction, and multiple data lines D1 to Dm extending in a column direction and intersecting the multiple gate lines G1 to Gn. The pixel units form an N*M matrix on the array substrate, where N and M each are positive integers. As an example, the matrix shown in FIG. 1 is a 9*9 matrix. The array substrate includes 9 gate lines and 9 data lines.

The structure of each pixel unit in the embodiment of the invention may be the same as the structure of a pixel unit in an array substrate in the conventional technology.

The manner of each pixel unit connecting to the gate line and the data line in the embodiment of the invention is the same as that in the conventional technology.

Figure 2:
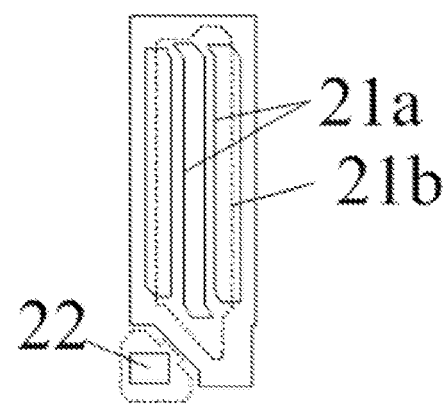
FIG. 2 is a schematic structural diagram of a pixel unit of the array substrate in FIG. 1.

As shown in FIG. 2, each pixel unit includes a pair of electrodes 21a and 21b and a Thin Film Transistor (TFT) 22 connected to one of the pair of electrodes. Furthermore, at least one of the pair of electrodes 21a and 21b may comprise a strip sub-electrode. In the structure shown in FIG. 2, the electrode 21a comprises strip sub-electrodes, and the electrode 21a may be a common electrode or a pixel electrode.

In order to enable the array substrate to detect whether a signal on the gate line is normal, besides the pixel units described above, the array substrate provided according to the embodiment of the invention further includes at least one additional functional area W provided in each row of a matrix formed by all the pixel units, where the additional functional area W is provided with a gate signal detecting transistor T. The gate signal detecting transistor T is a TFT transistor including a gate electrode, a source electrode and a drain electrode. As an example, on the array substrate shown in FIG. 1, each row of the matrix includes only one additional functional area W. However, it should not be understood that each row of the matrix of the array substrate in the embodiment of the invention includes only one additional functional area W, while each row of the matrix may practically include one or more additional functional areas.

The array substrate provided in the disclosure further includes a detection signal output line Gout and a preset signal line L, where the detection signal output line Gout is connected to the preset signal line L. The gate electrode and the source electrode of the gate signal detecting transistor T are connected to a gate line G corresponding to a row where the gate signal detecting transistor T is located, and the drain electrode of the gate signal detecting transistor T is connected to the preset signal line L.

In the embodiment of the invention, the detection signal output line Gout may be located at any position on the array substrate. As a specific embodiment of the invention, for the convenience of the wiring, the detection signal output line Gout is perpendicular to the data line D and parallel with the gate line G.

It should be noted that, in the embodiment of the invention, a shape and a position of the preset signal line L are not particularly defined, it is required that the drain electrode of the gate signal detecting transistor is connected to the preset signal line L, and the preset signal line L is connected to the detection signal output line Gout.

As a specific implementing way of the disclosure, the shape of the preset signal line L and the position on the array substrate at which the preset signal line L is located may be shown as FIG. 1. Specifically, the preset signal line L may be a straight line segment parallel with the column direction of the matrix; one preset signal line L is provided in each column where the gate signal detecting transistor T is located, and preset signal lines L located in different columns are independent from each other. The preset signal line L may be made of the same metal material as that of the data line D; the preset signal L is insulated from the gate line G and intersects the gate line G. The manner of wiring for the preset signal line is simple, and may be a conventional manner of wiring for the preset signal line known in the art. In addition, since preset signal lines in different columns do not intersect each other, the data line D may also be wired by adopting the conventional wiring manner in the art.

Figure 3:
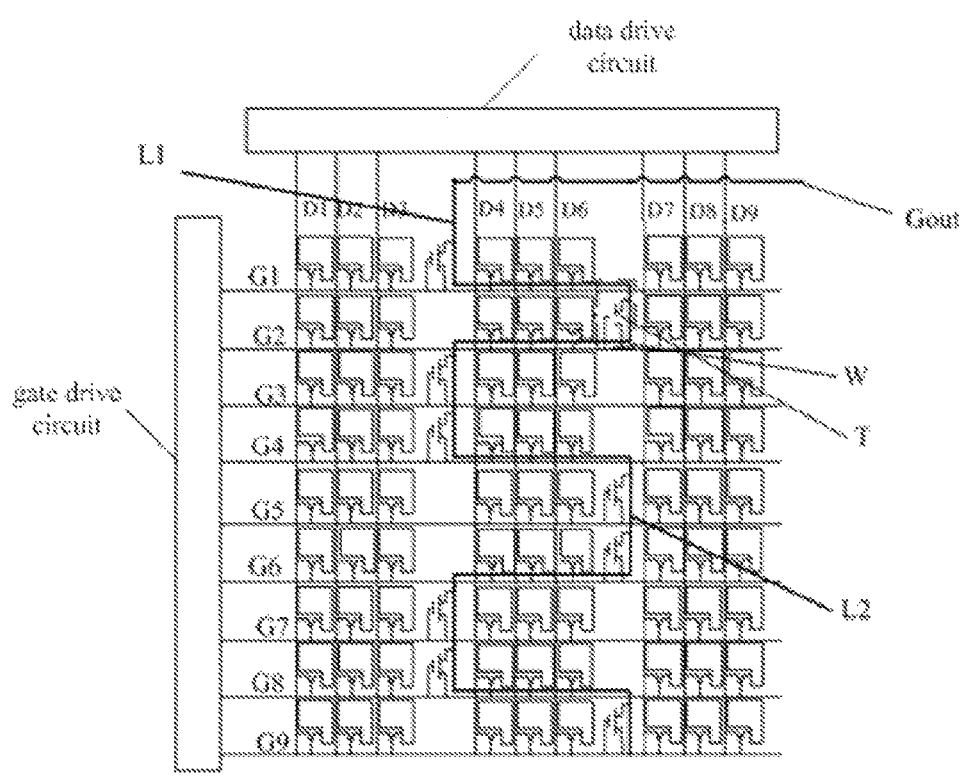
FIG. 3 is a schematic structural diagram of an array substrate according to an embodiment of the invention.

In another specific implementing way of the disclosure, the shape of the preset signal line L and its position on the array substrate may be shown as in FIG. 3. Specifically, the preset signal line L includes 3 preset signal sub-line segments L1 in a column and 3 preset signal sub-line segments L2 in another column. In this case, the shape of the preset signal line L is a broken line.

Actually, the preset signal line having a shape of a broken line is not limited to the shape shown in FIG. 3, which may include at least two preset signal sub-line segments which are located in different columns and connected with each other; and the preset signal sub-line segments are located in columns where the gate signal detecting transistors are located. Since the at least two preset signal sub-line segments are located in different columns, the preset signal sub-line segments need to be connected together via a connection line, so as to transmit a signal detected by the gate signal detecting transistor to the detection signal output line Gout. It should be noted that, in order to avoid affecting the display effect of the pixel unit, the connection line for connecting preset signal sub-line segments is located within a space between the pixel units, and electrically connects to the at least two preset signal sub-line segments through a via hole. The connection line may be made of the same metal material as that of the gate line G.

In the specific implementing way, signals from multiple columns of gate signal detecting transistors may be transmitted to the detection signal output line Gout by one preset signal line L. In order to clearly illustrate the connection between each electrode end of the gate signal detecting transistor T, the gate line and the preset signal line L, hereinafter the connection manner for the gate electrode, the source electrode and the drain electrode of the each gate signal detecting transistor T is illustrated by taking the gate signal detecting transistor T located in the i-th row as an example. Specifically, the gate electrode and the source electrode of the gate signal detecting transistor T located in the i-th row are connected to the i-th gate line Gi, and the drain electrode of the gate signal detecting transistor T is connected to a preset signal line L corresponding to a column where the gate signal detecting transistor is located.

The working principle for detecting whether a drive signal on the gate line works normally by the array substrate is as follows.

It is illustrated by taking an amorphous silicon semiconductor as an example. Since the amorphous silicon is an N-type semiconductor, a signal for gate gating is a high level signal.

In the case that a gate driver on a certain gate line of the array substrate works normally, the gate driver applies a high level signal to the gate line to turn on the gate line, and a voltage obtained on the gate line is a high level voltage. The gate signal detecting transistor connected to the gate line is turned on, and a signal on the gate line is transmitted to the detection signal output line Gout via the preset signal line L. In this way, a high level signal is obtained on the detection signal output line Gout.

In the case that a gate driver on a certain gate line of the array substrate malfunctions, no voltage signal can be obtained on the gate line or an abnormal voltage signal is obtained on the gate line. Since a normal high level signal cannot be obtained on the gate line, an abnormal level signal is obtained on the preset signal line L connected to the gate line or no level signal can be obtained on the preset signal line L. Therefore, no high level signal can be obtained on the detection signal output line Gout connected to the preset signal line L.

Hence, whether the drive signal on the gate line is normal may be determined using the signal on the detection signal output line Gout. Consequently, whether the gate driver on the gate line malfunctions may be determined.

Figure 4:
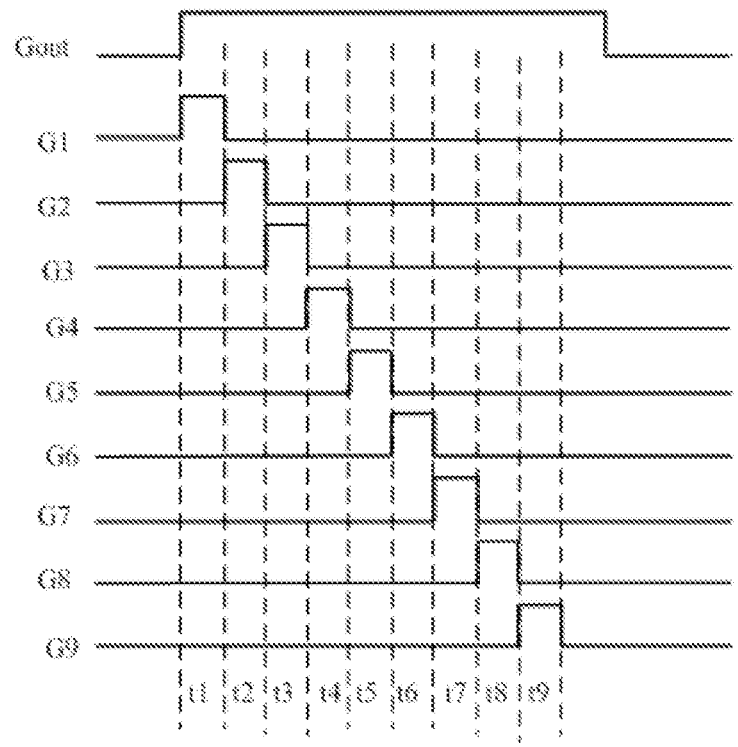
FIG. 4 is a timing diagram of a voltage on each gate line and a voltage on a detection signal output line, in the case that a drive signal on each gate line of the array substrate is normal according to an embodiment of the invention.

Referring still to the array substrate shown in FIG. 1 as an example, the array substrate includes 9 gate lines. FIG. 4 is a timing diagram of a voltage on each gate line and a voltage on the detection signal output line, in the case that the drive signal on each gate line of the array substrate is normal according to an embodiment of the invention. The 9 gate lines are turned on in sequence, when detecting signals on the 9 gate lines of the array substrate. If a high level signal can be obtained on each of the 9 gate lines, in the process of detection, i.e., any period of time from t1 to t9, the signal detected on the detection signal output line Gout is always a high level signal, which indicates that the drive signal on each of the 9 gate lines is normal. The gate driver for driving each gate line works normally and does not malfunction.

Figure 5:
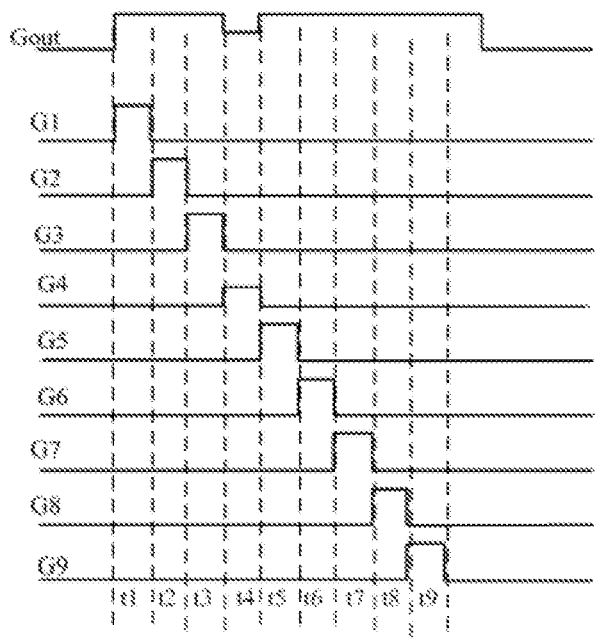
FIG. 5 is a timing diagram of a voltage on each gate line and a voltage on a detection signal output line, in the case that a drive signal on a certain gate line of the array substrate is abnormal according to an embodiment of the invention.

In the case that no voltage signal can be obtained or an abnormal voltage signal is obtained on a certain gate line, no voltage signal can be obtained or an abnormal voltage signal is obtained on the detection signal output line Gout at a certain time instant. It may be determined that the gate line on which an abnormal signal occurs, by comparing a period of time instant when no voltage signal is obtained or a period of time instant when the abnormal voltage signal occurs with a period of time instant when the gate line is turned on. It is illustrated by taking FIG. 5 as an example. Assuming that a signal detected within a period of time t4 is abnormal, it is indicated that the drive signal on the fourth gate line G4 is abnormal, consequently, it is indicated that the driver for driving the fourth gate line G4 malfunctions.

In addition, since the gate drive signal for driving each gate line of the array substrate is a periodic signal (a row scanning period), and different gate lines are turned on at different time instants of one period, it may be determined that the gate line that malfunctions based on the period of the gate drive signal and the period of time during which the abnormal gate signal occurs.

Therefore, based on the above principles, the gate signal detecting transistor on the array substrate may detect whether the drive signal on each gate line is normal. The gate line on which an abnormal signal occurs may be detected based on the period of time during which the abnormal signal is output from the detection signal output line and the period of the gate line. Compared with the conventional technology in which whether the drive signals on the gate lines are normal is detected manually one by one, with the array substrate provided with the gate signal detecting transistor according to the disclosure, the detection efficiency and detection accuracy can be improved.

In the above array substrate shown in FIG. 1 or FIG. 3, each row is provided with only one additional functional area, that is to say, each row of the matrix is provided with only one gate signal detecting transistor. In this case, the intensity of the detection signal transmitted to the detection signal output line is weak. In order to increase the intensity of the detection signal and improve the accuracy of detection, in another embodiment of the invention, each row of the matrix may be provided with multiple additional functional areas, and each additional functional area is provided with a gate signal detecting transistor.

It should be noted that, in the case that the preset signal line L is a straight line segment parallel to the column of the matrix, a preset signal line L needs to be provided in a column corresponding to each gate signal detecting transistor, and each preset signal line L is connected to the gate signal output line. In brief, the number of the gate signal detecting transistors equals to the number of the preset signal lines L to be provided.

In addition, the number of the additional functional areas provided in a row of the matrix of the array substrate may be the same as or different from that provided on another row of the matrix of the array substrate. Preferably, the number of the additional functional areas provided in each row of the matrix is the same.

In order to simplify the structure of the array substrate, preferably the number of columns in which the additional functional areas of the array substrate are located is as small as possible. Specifically, in the case that each row is provided with one additional functional area, all the additional functional areas are located in the same column. In the case that each row of the matrix is provided with two additional functional areas, all the additional functional areas are located in two columns. A schematic diagram of the structure of the matrix array may be shown as FIG. 6. The array substrate shown in FIG. 6 includes a 9*9 matrix. Each row of the matrix is provided with three additional functional areas. The array substrate includes 3 columns of additional functional areas, and the number of the additional functional areas in each column is 9.

Figure 7:
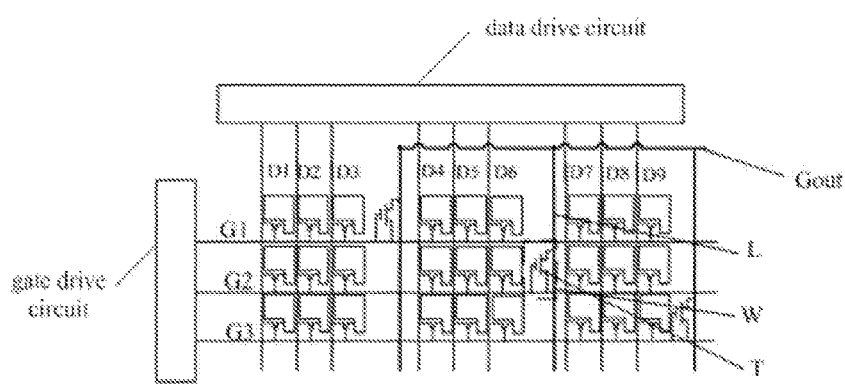
FIG. 7 is a schematic diagram of an array substrate in which the number of columns occupied by additional functional areas is the maximum, according to an embodiment of the invention.

In another embodiment of the invention, the number of the columns in which the additional functional areas of the array substrate are located is as large as possible. Specifically, in the case that each row of the matrix is provided with one additional functional area, any two of the additional functional areas may not be located in the same column, if the number of columns of the matrix is large enough. For a schematic diagram of the structure of the matrix array, one may refer to FIG. 7. The array substrate shown in FIG. 7 includes a 3*9 matrix, each row of the matrix is provided with only one additional functional area, and any two of the three additional functional areas are not located in the same column. In this case, the number of the columns in which the additional functional areas of the array substrate are located is the maximum. The dispersed distribution of the additional functional areas is beneficial to improve the display performance of a liquid crystal display panel including the array substrate.

In order to control a transmittance of the array substrate with the additionally provided functional area to be within a certain range, that is, to prevent a large loss of the transmittance of the array substrate due to the additionally provided functional area, in the row direction of the matrix, every preset number of pixel units may be provided with one additional functional area, to have the transmittance of the pixel units to meet a predetermined requirement (value). Since a normal display may be performed only by combining three pixel units R, G and B together, in the embodiment of the invention, the preset number may be 3h, where h is a positive integer. That is to say, the preset number is a multiple of 3, for example 3, 6, 9, etc.

In addition, the inventors of the disclosure performed a careful study and analysis of the relationship between the transmittance of the pixel unit and the size of the pixel unit.

The inventors found that the transmittance of the pixel unit is low, in the case that an electrode (generally being an ITO electrode) of the pixel unit is wide or a slit between the pixel electrodes is wide. In addition, the inventors further conducted the following experiments: decreasing the width of the pixel unit and testing the display performance of the decreased pixel unit, and the obtained data is provided in the following table.

| the width of the pixel unit (μm) | the efficiency of the liquid crystal % | aperture ratio % | transmittance % |
|---|---|---|---|
| 26.5 | 14.67 | 53.21 | 100 |
| 24.5 | 14.56 | 52.00 | 96.99 |
| 22.5 | 14.52 | 50.58 | 94.09 |
| 20.5 | 14.45 | 49.63 | 91.85 |

The table shows that with the decreasing width of the pixel unit, the transmittance of the pixel unit reduces slowly and not abruptly.

In the embodiment of the invention, the width of the pixel unit is defined as the width of a display region of the array substrate in a scanning line extending direction divided by the number of pixels in the scanning line extending direction.

According to the study by the inventors, the transmittance of the pixel unit is low, in the case that the strip sub-pixel electrode or the sub-common electrode is wide or the slit between the sub-pixel electrodes or the sub-common electrode is wide. Decreasing the width of the pixel unit by appropriately decreasing the width of the strip sub-pixel electrode or the sub-common electrode or the width of the slit between the strip sub-electrodes or the sub-common electrode does not cause the transmittance of the pixel unit to drop abruptly. Therefore, in order to ensure that a difference between the transmittance of the array substrate provided according to the disclosure and the transmittance of an array substrate in the conventional technology is within a certain range, in the embodiment of the invention, the widths of part or all of the pixel units in the array substrate are decreased without decreasing the number of pixel units, and the additional functional area is provided within a space of the array substrate saved by the decreased size of the pixel units.

In addition, in order to enable the transmittance of the array substrate provided by the disclosure to meet the preset requirement, the width of the pixel unit should be greater than a preset value. In addition, the line-width and the line-space of the sub-pixel electrode should greater than a preset value due to the limitation of a resolution of an exposure machine. Therefore, the width of the pixel unit provided in the disclosure can not be decreased unlimitedly and should meet a certain requirement.

Since the width of each pixel unit may only be decreased to a limited size, in order to enable the additional functional area provided with the gate signal detecting transistor to be accommodated within the region saved by the decreased size of the pixel units, in the array substrate provided in the disclosure, one additional functional area may be provided to every multiple pixel units in the row direction of the matrix. Specifically, one additional functional area may be provided to a predetermined number of pixel units in the row direction of the matrix, such that the transmittance of the pixel unit meets the predetermined requirement.

Taking a pixel unit with the width of 26.5 μm an example, the width of the pixel may be decreased by 0.5 μm to 2.5 μm. Thus, each decreased pixel unit saves a region with the width of 0.5 μm to 2.5 μm, and n decreased pixel units save n regions with the width of 0.5 μm to 2.5 μm. Regions saved by multiple pixel units may accommodate one additional functional area.

Figure 8:
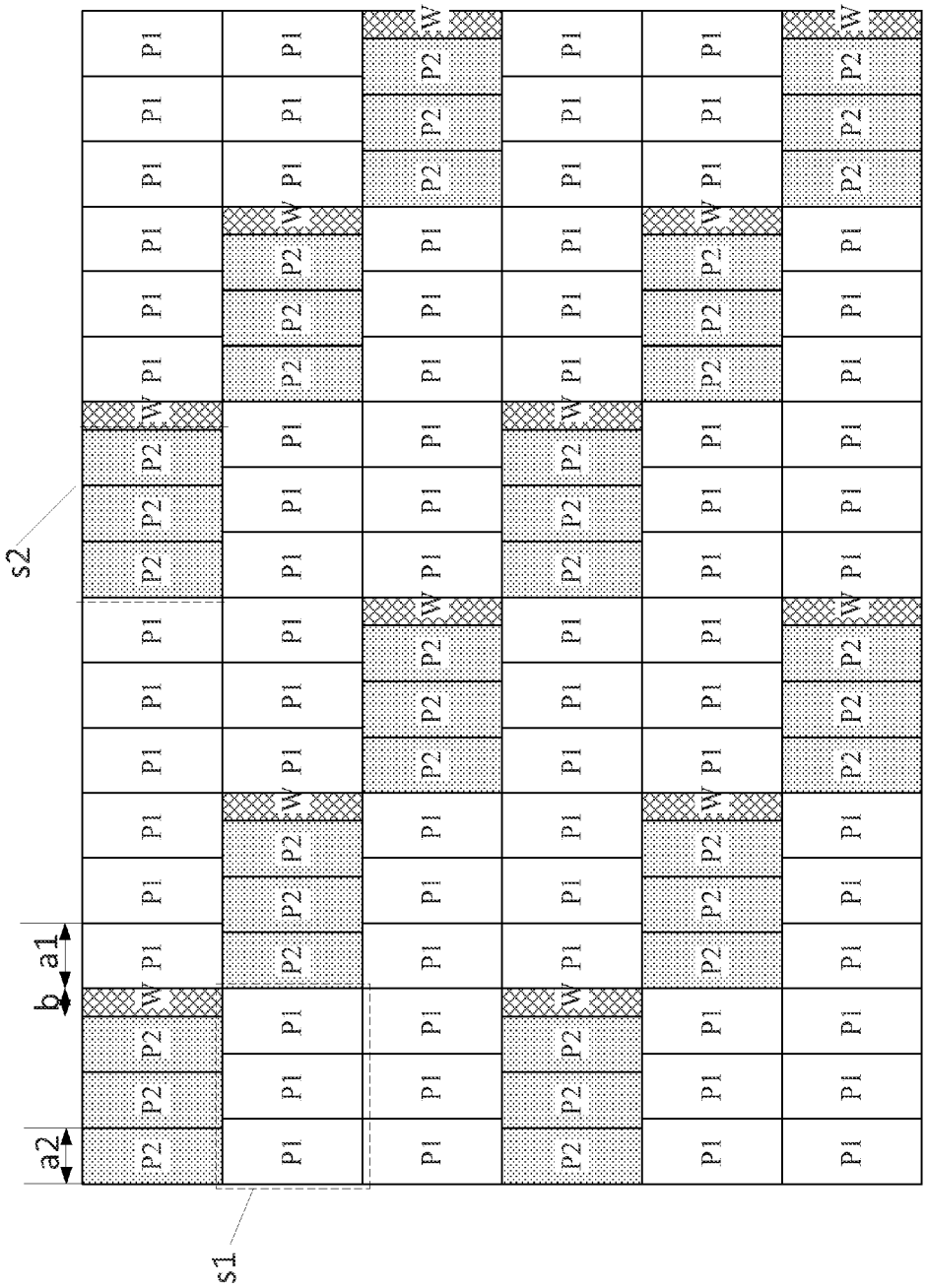
FIG. 8 is a schematic structural diagram of an array substrate in which the widths of pixel units are different, according to an embodiment of the invention.

In a specific embodiment of the invention, as shown in FIG. 8, the pixel units on the array substrate include a first pixel unit P1 and a second pixel unit P2, where the width a1 of the first pixel unit P1 is greater than the width a2 of the second pixel unit P2. On the array substrate shown in FIG. 8, the matrix is a 6*18 matrix.

It should be noted that, in order to embody the key point, in FIG. 8 only the pixel units and the additional functional areas are shown while no signal line is shown. In this way, the size and the positional relationship between the additional functional area, the first pixel unit and the second pixel unit can be understood more clearly. Actually, the array substrate shown in FIG. 8 includes the various signal lines described above.

Since each pixel unit can only display a primary color, and a normal display of the array substrate is implemented by combining three pixel units together, in the embodiment of the invention, 3*p first pixel units P1 are disposed together, where p is a positive integer, and 3*q second pixel units P2 are disposed together, where q is a positive integer. In other words, at least 3 first pixel units P1 are disposed together, and at least 3 second pixel units P2 are disposed together. Pixel units in a region 51 shown in FIG. 8 are 3 first pixel units P1 which are disposed together, and pixel units in a region S2 shown in FIG. 8 are 3 second pixel units P2 which are disposed together.

Since the width a2 of the second pixel unit is less than the width a1 of the first pixel unit, compared with the width of n first pixel units, n second pixel units may save a region with a width of n*(a1−a2), and an additional functional area W may be provided within the saved region. Therefore, in the embodiment of the invention, the width of the additional functional area is b=3n*(a1−a2), where n is a positive integer. For different width of the additional functional area, width a1 of the first pixel unit and width a2 of the second pixel unit, n may be a positive integer, for example 1, 2 and 3. In case of n=1, 3*a2+b=3*a1, and one additional functional area is provided within a region saved by 3 second pixel units. In case of n=2, 6*a2+b=6*a1; and one additional functional area is provided within a region saved by 6 second pixel units. Therefore, according to the embodiment of the invention, one additional functional area is provided within a region saved by 3n second pixel units.

As shown in FIG. 8, the additional functional areas W are dispersedly distributed on the array substrate, which is beneficial to improve the display effect of the liquid crystal panel compared with a centralized distribution mode.

In the row direction of the matrix, every 3h second pixel units may be provided with one additional functional area, where h is a positive integer. Specifically, in the row direction of the matrix, every, 3, 6, 9 or 12 pixel units may be provided with one additional functional area.

In the case that each row of the matrix includes multiple additional functional areas, the number of the columns in which the additional functional areas of the array substrate are located is as small as possible. In another embodiment of the invention, the number of columns in which the additional functional areas of the array substrate are located is as large as possible. In order to enable that the additional functional areas are distributed regularly on the array substrate, the j-th additional functional area in the (i+1)-th row is shifted by 3*k pixel units relative to the j-th additional functional area in the i-th row in the row direction (left or right), where i, j and k are positive integers.

In order to make the structure of the array substrate to be understood clearly, hereinafter it is illustrated by taking a 9*9 matrix as an example. In each row of the matrix, every 3 pixel units is provided with one additional functional area.

Figure 6:
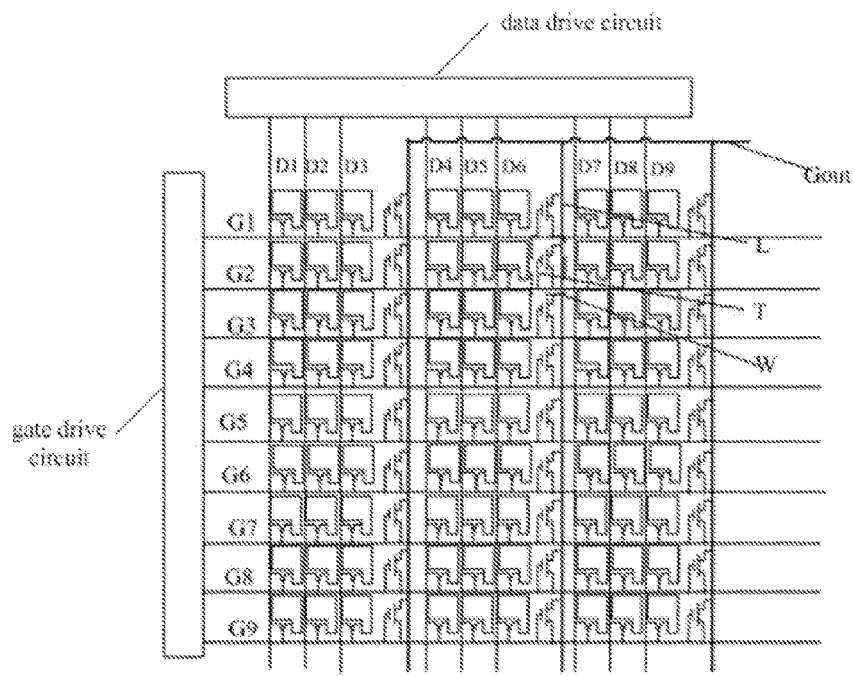
FIG. 6 is a schematic structural diagram of an array substrate in which the number of columns occupied by additional functional areas is the minimum, according to an embodiment of the invention.

Referring back to FIG. 6, the structure of an array substrate in which j-th additional functional areas of each row of the matrix are located in the same column is illustrated. As shown in FIG. 6, each row of the matrix is provided with 3 additional functional areas, and there are a total of 27 additional functional areas located in 3 columns. That is to say, the first additional functional areas of all the rows are located in the same first column, the second additional functional areas of all the rows are located in the same second column, and the third additional functional areas of all the rows are located in the same third column. In this manner of distribution, the number of columns in which the additional functional areas are located is the minimum.

Figure 9:
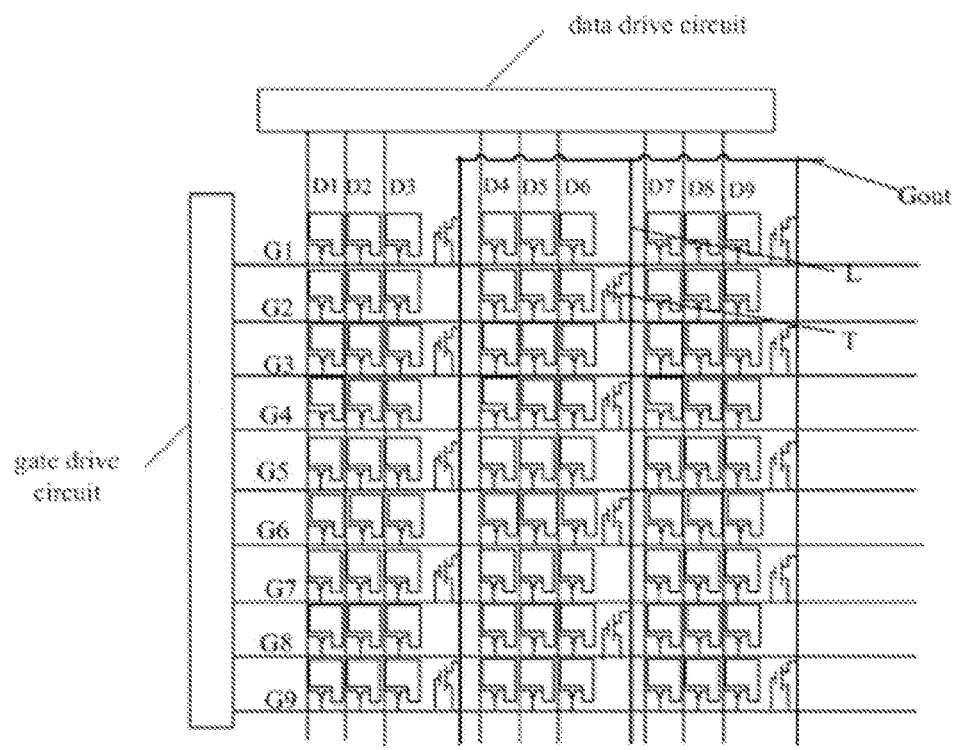
FIG. 9 is a schematic structural diagram of an array substrate in which the j-th additional functional area in the (i+1)-th row of the matrix is shifted by 3 pixel units relative to the j-th additional functional area in the i-th row in a row direction, according to an embodiment of the invention.

FIG. 9 shows a schematic structural diagram of another distribution of the additional functional areas on the array substrate according to an embodiment of the invention. In the distribution structure shown as FIG. 9, the j-th additional functional area in the (i+1)-th row is shifted left or right by 3 pixel units from the j-th additional functional area on the i-th row, where both i and j are positive integers. That is to say, the j-th additional functional areas on any two adjacent rows are shifted left or right by 3 pixel units relative to each other. According to the embodiment of the invention, additional functional areas in each row are sorted in a direction (for example from left to right) of the array substrate, they are in turn referred to as a first additional functional area, a second additional functional area, a third additional functional area, . . . , the j-th additional functional area, etc.

The specific implementing ways for the structure of the array substrate provided according to the embodiments of the invention are described above. Based on the array substrate, a liquid crystal display panel including the array substrate is further provided according to an embodiment of the invention. For the liquid crystal display panel, one may refer to another embodiment.

Figure 10:
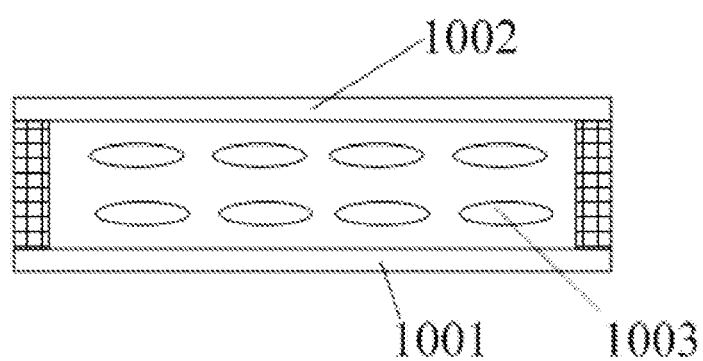
FIG. 10 is schematic sectional structural diagram of a liquid crystal display panel according to an embodiment of the invention.

As shown in FIG. 10, the liquid crystal display panel provided according to the second embodiment of the invention includes an array substrate 1001 and a color film substrate 1002 opposite to the array substrate 1001. The array substrate is described in the above embodiments. The array substrate 1001 and the color film substrate 1002 are fixedly connected with each other and form an enclosed cavity filled with liquid crystal 1003.

Figure 11:
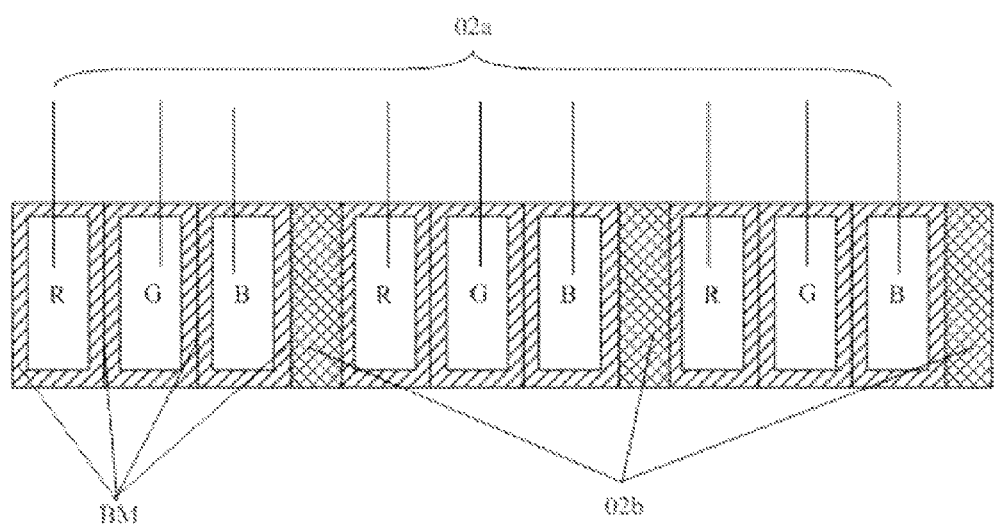
FIG. 11 is a schematic structural diagram of a color film substrate of the liquid crystal display in FIG. 10.

Furthermore, as shown in FIG. 11, the color film substrate includes multiple light transmitting regions 02a and multiple preset light blocking regions 02b. Each light transmitting region 02a of the color film substrate is provided with one pixel display unit R, G or B. A black matrix BM is provided around each pixel display unit. In the liquid crystal display panel, a position of the pixel display unit of the color film substrate is opposite to a position of the pixel unit of the array substrate, and a position of the preset light blocking region 02b of the color film substrate is opposite to a position of the additional functional area W of the array substrate. Since there is no pixel electrode and common electrode on the additional functional area, liquid crystal molecules in the location corresponding to the additional functional area cannot rotate normally in case of being driven by an electric field, that is, the additional functional area can not display normally. Therefore, the additional functional area is opposite to the preset light blocking region 02b of the color film substrate and does not affect the display performance of the liquid crystal display panel.

In general, the light transmitting region 02a and the preset light blocking region 02b of the color film substrate are referred to as a display region of the liquid crystal display panel. Since the additional functional area is arranged at a position on the array substrate opposite to the preset light blocking region, the additional functional area is arranged at the display region of the liquid crystal display panel. Since the gate signal detecting transistor in the additional functional area may detect a drive signal on the detecting gate line, a new function is added to the display region of the liquid crystal display panel provided in the disclosure.

While preferred embodiments of the invention have been described, it will be apparent to those skilled in the art that various improvements and modifications may be made without departing from the principles of the present invention. Therefore, the appended claims and their equivalents determine the scope of the invention.

What is claimed is:

1. An array substrate, comprising:
a plurality of pixel units defined by a plurality of gate lines and a plurality of data lines intersecting each other, wherein the plurality of pixel units are arranged in a matrix of rows and columns;
a plurality of additional functional areas located in each row of the matrix and located in a display region of the array substrate, an additional functional area comprising a gate signal detecting transistor;
a detection signal output line; and
a preset signal line connected with the detection signal output line;
wherein:
the gate signal detecting transistor comprises a gate electrode, a source electrode and a drain electrode, the gate electrode and the source electrode being directly connected to a gate line of the plurality of gate lines associated with a row in which the gate signal detecting transistor is located, and the drain electrode being directly connected to the preset signal line,
the gate signal detecting transistor is connected to the detection signal output line by the preset signal line and outputs a detection signal of the gate line of the plurality of gate lines associated with the row, in which the gate signal detecting transistor is located, to the detection signal output line,
and
a distribution of the plurality of additional functional areas on the array substrate maximizes a number of columns in which the additional functional areas are located.

2. The array substrate according to claim 1, wherein every 3h pixel units in a row direction of the matrix is provided with an additional functional area, h being a positive integer.

3. The array substrate according to claim 2, wherein a j-th additional functional area in an (i+1)-th row is shifted by 3k pixel units relative to the j-th additional functional area in an i-th row in the row direction, i, j, and k being positive integers.

4. The array substrate according to claim 1, wherein the pixel units comprise a plurality of first pixel units and a plurality of second pixel units, wherein 3p first pixel units are disposed together, and 3q second pixel units are disposed together, p and q being positive integers; and wherein every 3h pixel units in a row direction of the matrix are provided with an additional functional area, h is a positive integer, a width of a first pixel unit is defined as a1, a width of a second pixel unit is defined as a2, and a width of the at least one additional functional area is defined as b, wherein a1, a2, and b satisfy the following relations:

$b=3n*(a1-a2)$, n being a positive integer; and $a1>a2$.

5. The array substrate according to claim 1, wherein the detection signal output line is parallel to the gate line.

6. The array substrate according to claim 1, wherein the preset signal line is a straight line segment parallel to a column direction of the matrix, the preset signal line is provided in each column where the gate signal detecting transistor is located, and preset signal lines located in different columns where each column is provided with a gate signal detecting transistor are independent from each other.

7. The array substrate according to claim 1, further comprising a plurality of preset signal lines arranged in columns where one or more gate signal detecting transistors are located, wherein the plurality of preset signal lines arranged in different columns are independent from each other.

8. The array substrate according to claim 1, wherein the preset signal line comprises at least two preset signal sub-line segments located in different columns and connected with each other, and the at least two preset signal sub-line segments are located in columns where gate signal detecting transistors are located.

9. The array substrate according to claim 1, wherein each pixel unit comprises a pair of electrodes, and at least one of the pair of electrodes comprises a strip sub-electrode.

10. A liquid crystal display panel, comprising an array substrate, wherein the array substrate comprises:
a plurality of pixel units defined by a plurality of gate lines and a plurality of data lines intersecting each other, wherein the plurality of pixel units are arranged in a matrix of rows and columns;
a plurality of additional functional areas located in each row of the matrix and located in a display region of the array substrate, an additional functional area comprising a gate signal detecting transistor;
a detection signal output line; and
a preset signal line connected with the detection signal output line;
wherein the gate signal detecting transistor comprises a gate electrode, a source electrode and a drain electrode, the gate electrode and the source electrode being directly connected to a gate line associated with a row in which the gate signal detecting transistor is located, and the drain electrode being directly connected to the preset signal line, and
the gate signal detecting transistor is connected to the detection signal output line by the preset signal line and outputs a detection signal of the gate line of the plurality of gate lines associated with the row, in which the gate signal detecting transistor is located, to the detection signal output line,
and
a distribution of the plurality of additional functional areas on the array substrate maximizes a number of columns in which the additional functional areas are located.

11. The liquid crystal display panel according to claim 10, further comprising a color film substrate opposite to the array substrate, wherein the color film substrate comprises a light transmitting region and a preset light blocking region, the light transmitting region is provided with a pixel display unit which is opposite to a pixel unit of the plurality of the array substrate, and the preset light blocking region is opposite to the additional functional area of the array substrate.

12. The liquid crystal display panel according to claim 10, wherein every 3h pixel units in a row direction of the matrix is provided with an additional functional area, h being a positive integer.

13. The liquid crystal display panel according to claim 12, wherein a j-th additional functional area in an (i+1)-th row is shifted by 3k pixel units relative to the j-th additional functional area in an i-th row in the row direction, i, j, and k being positive integers.

14. The liquid crystal display panel according to claim 10, wherein the pixel units comprise a plurality of first pixel units and a plurality of second pixel units, wherein 3p first pixel units are disposed together, and 3q second pixel units are disposed together, p and q being positive integers; and wherein every 3h pixel units in a row direction of the matrix are provided with an additional functional area, h is a positive integer, a width of a first pixel unit is defined as a1, a width of a second pixel unit is defined as a2, and a width of the at least one additional functional area is defined as b, wherein a1, a2, and b satisfy the following relations:

$b=3n*(a1-a2)$, $n$ being a positive integer; and $a1 > a2$.

\* \* \* \* \*